(12) United States Patent
Stevens (10) Patent No.: US 7,773,116 B1
(45) Date of Patent: Aug. 10, 2010

(54) DIGITAL IMAGING STABILIZATION

(75) Inventor: Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 740 days.

(21) Appl. No.: 11/349,760

(22) Filed: Feb. 8, 2006

(51) Int. Cl.
*H04N 5/228* (2006.01)
*H04N 5/225* (2006.01)

(52) U.S. Cl. .................... 348/208.4; 348/144; 348/159; 348/169; 348/208.2; 348/208.14; 348/373

(58) Field of Classification Search ........................ None
See application file for complete search history.

(56) References Cited

U.S. PATENT DOCUMENTS

| | | | |
|---|---|---|---|
| 3,039,002 A | 6/1962 | Guerth | |
| 3,891,798 A | 6/1975 | Marcus | |
| 3,982,255 A | 9/1976 | Orlando | |
| 4,290,364 A * | 9/1981 | Weidenhagen et al. ...... | 102/384 |
| 4,637,571 A | 1/1987 | Holder et al. | |
| 4,805,018 A | 2/1989 | Nishimura et al. | |
| 5,091,781 A | 2/1992 | An | |
| 5,129,595 A | 7/1992 | Thiede et al. | |
| 5,432,546 A * | 7/1995 | Cargill ........................ | 348/144 |
| 5,897,223 A * | 4/1999 | Tritchew et al. ............... | 396/13 |
| 6,130,705 A * | 10/2000 | Lareau et al. ............... | 348/144 |
| 6,179,246 B1 | 1/2001 | Fisel et al. | |
| 6,298,143 B1 * | 10/2001 | Kikuchi et al. ............... | 382/103 |
| 6,422,508 B1 | 7/2002 | Barnes | |
| 6,507,366 B1 | 1/2003 | Lee | |
| 6,672,535 B2 * | 1/2004 | Brunner et al. ............. | 244/3.16 |
| 6,771,306 B2 * | 8/2004 | Trajkovic et al. ............ | 348/170 |
| 6,809,758 B1 | 10/2004 | Jones | |
| 6,859,546 B2 * | 2/2005 | Matsukawa et al. ......... | 382/103 |
| 7,098,940 B2 * | 8/2006 | Suzuki et al. ................ | 348/143 |
| 7,266,220 B2 * | 9/2007 | Sato et al. .................... | 382/104 |
| 7,602,415 B2 * | 10/2009 | von Flotow et al. ......... | 348/144 |
| 2002/0118761 A1 | 8/2002 | Lee | |
| 2004/0183917 A1 * | 9/2004 | von Flotow et al. .... | 348/208.99 |
| 2004/0189830 A1 * | 9/2004 | Pollard .................... | 348/240.1 |
| 2005/0201759 A1 | 9/2005 | Wang et al. | |
| 2006/0291695 A1 * | 12/2006 | Lipton et al. ................ | 382/103 |
| 2009/0316012 A1 * | 12/2009 | Matos .................... | 348/208.14 |

* cited by examiner

*Primary Examiner*—Ngoc-Yen T Vu
(74) *Attorney, Agent, or Firm*—Brooks, Cameron & Huebsch, PLLC (57) ABSTRACT

One apparatus embodiment includes a target tracking apparatus. The apparatus includes a reference camera, a processor to receive image data from the reference camera, and memory connected to the processor. The apparatus includes instructions storable in the memory and executable by the processor to process the image data to determine a target region within a first frame of the image data. The device also includes instructions that can be executed to compare image data of the first frame with image data of a second frame to locate the target region in the second frame.

26 Claims, 7 Drawing Sheets

DIGITAL IMAGING STABILIZATION

FIELD OF THE INVENTION

The present disclosure generally relates to digital imaging. And, in particular, the present disclosure relates to apparatuses, systems, and methods for digital imaging stabilization.

BACKGROUND

Digital images, such as those obtained from digital cameras or other digital imagers often contain undesirable motion between successive image frames. In handheld cameras, the motion can result from a user of the device moving while operating the camera. For example, the digital image may move because the user is walking while operating the camera or because the user's hand is shaking, or wobbling among other reasons.

Motion between successive digital frames can also occur due to vehicle motion. The motion can occur due to internal sources such as vibrations of the vehicle and/or external sources such as atmospheric effects (e.g., effects of wind or localized pressure changes on the vehicle). This can be undesirable for imaging applications that can use various digital image sensors including multi-spectral sensors, hyper-spectral sensors, including electro-optical television and infrared sensors, among others. Targeting applications that often use the image data to determine where to point various pointing devices such as laser designators, range finders, spot trackers, and illuminators, among other devices, can have difficulty maintaining their focus of interest due to such motion.

Many imaging and targeting applications use on board guidance apparatuses such as a global positioning system (GPS), inertial navigation system (INS), and/or other such apparatuses or systems, in order to collect information about a particular target for imaging. In such embodiments, imaging circuitry and/or computer executable instructions can be used to track a camera's position with respect to the location of a target and can adjust the camera accordingly.

Such guidance systems can assist in target acquisition and pointing by reducing the unwanted motion between digital frames due to various sources. However, obtaining the necessary position data can provide reduced accuracy since the data acquisition may not occur at a sufficiently real-time rate.

SUMMARY

Embodiments of the present disclosure provide apparatuses, systems, and methods for digital imaging stabilization for target tracking and/or controlling movable apparatuses. For example, various apparatus embodiments of the present disclosure can include a reference camera, a processor to receive image data, and a memory connected to the processor.

In such embodiments, the reference camera can be a mega-pixel camera having a pixel density of ones or tens of mega-pixels (e.g., a 5 or 12 mega-pixel camera). The reference camera can have a digital zooming capability and/or a digital panning capability and can be fixed or mounted to a movable mount structure. In unmanned vehicles, the reference camera can be the camera used for navigation of the vehicle by a remotely controlled pilot.

In various embodiments, a target region can be determined within a frame of the image data. This information can be compared to the image data of another frame (e.g., a subsequent image frame) to locate the target region in the subsequent frame.

That is, a target region can include a targeted object and/or surface that can have identifiable characteristics (e.g., shape, color, composition, etc.) such that image data associated with the object and/or surface can be used as a reference point from frame to frame. For example, an object, within a target region of a first image frame, which has a distinct size and/or shape, can be recognizable in the image data of a subsequent frame. This information can be used to locate the target region in a subsequent frame. This can be accomplished by searching a subsequent image frame, or a portion thereof, for one or more characteristics of the target region. Executable instructions and/or logic circuitry can be used to provide such target region location functionality.

In various embodiments, instructions can be executed to calculate a frame shift between a first frame and a second frame by using the position of the target region within the first frame and the position of the target region within the second frame. For example, if the position of the target region within a first frame changes (e.g., the location of the target region moves a certain number of pixels) from the first frame to the second frame (e.g., due to movement of the camera, etc.), then a frame shift can be calculated based on the change in the position of the target region within the frames.

In various embodiments, a user's view of the image data can be adjusted to maintain the target region in a particular position on a viewable interface from frame to frame. The user can be located at or near the location of the camera or at a remote location. The viewable interface can include the screen of a desktop, laptop, or other computing device. In some embodiments, the particular position on the viewable interface can be the target region in the center of the viewable interface or in any other location of the interface. In such embodiments, this positioning can be accomplished by executable instructions and/or logic circuitry.

In some embodiments, the apparatus can include a movable targeting device such as a device using a gimbal movement mechanism. In such embodiments, the movable device can be attached to a vehicle (e.g., a manned or unmanned aerial, land, or water vehicle, etc.). The targeting device can include various targeting components including an imaging sensor, a laser rangefinder, a laser designator, and a laser spot tracker among other targeting components. The imaging sensor(s) can include various multi-spectral and/or hyper-spectral sensors. Examples of such sensor types include electro-optical (EO) sensors and infrared (IR) sensors, among others.

In various embodiments, the movement of the targeting device can be based on the calculated frame shift discussed above. For example, a movable targeting device (or one of its targeting components) can be oriented so that it is pointing at a particular target (e.g., an object within a target region of a first frame).

As discussed above, motion of the targeting device (or vehicle), due to various environmental or atmospheric effects, can increase the difficulty of accurately pointing targeting devices. Therefore, in various embodiments of the present disclosure, the movable targeting device can be moved to a different position based upon the calculated frame shift. For example, assume that initially the targeting device is oriented so that it is pointing at an object in the target region of a first image frame. Then assume that in the next image frame the target region has moved (due to movement of the vehicle along its flight or driving path, due to wind, or due to some other motion).

As discussed above, program instructions, for example, can be executed to calculate the frame shift based on the movement of the target region from frame to frame. In various embodiments, the calculated frame shift information can then be used to determine the direction and amount to move the targeting device such that the device remains pointed at the target.

In various method embodiments, a method for digital image stabilization can include capturing a first image of a target region at a first time, capturing a second image of the target region at a later time, determining a change in position for a vehicle by comparing the image data from the captured images, and calculating image stabilization information based on the determined change in position of the vehicle.

In method embodiments, the images can be captured with a camera that is attached to the vehicle, which can include a manned or unmanned aerial vehicle, for example (e.g., an airplane, a space vehicle, or other aerial vehicle). The comparison of the image data from the captured images can include comparing the location of the target region in the captured images (e.g., image frames). As mentioned above, the target region can include an object and/or surface that can be identifiable within the image data due to characteristics of the object that may include its color, shape, and/or composition, among other characteristics.

Changes in the location of the target region in the captured images refer to a shift of the target region from one image to another. As mentioned above, the changes can result from camera movement and the shift can be detected by sensor elements (e.g., pixels of the camera). For example, the movement can be detected due to the shift of the target region by a few pixels up or down from image to image. Based on this amount of movement of the vehicle, the target region can shift by one pixel, a few pixels, many pixels, etc.

Various embodiments of the present disclosure can include logic circuitry and/or executable instructions that can be executed to determine the change in position of the vehicle that corresponds to a particular shift (e.g., a number of pixels) of the target region. As discussed below, various embodiments can include logic circuitry and/or executable instructions that can be executed to calculate image stabilization information based on the change in position of the vehicle.

Various method embodiments can include controlling a movable apparatus (e.g., a gimbaled apparatus) based upon the calculated image stabilization information. Image stabilization information refers to information that can be calculated based upon the change in position of the vehicle. Image stabilization information also refers to information that can be used to determine the direction and amount a movable apparatus is to be moved such that it, or one of its components, remains pointed at a particular target (e.g., a particular object, surface, or a part thereof).

In some embodiments, the movable apparatus can be controlled on a per-image basis. That is, the system can be designed such that the movable apparatus can move automatically based on position changes of the vehicle on a frame by frame basis. In various embodiments, the captured images and/or image stabilization information can be sent to a remote device (e.g., a computing device) and the movable apparatus can be controlled (e.g., moved, oriented, steered, etc.) from the remote device. The remote device can include a processor, a memory, as well as other logic circuitry and executable instructions for receiving and processing information from the vehicle and controlling the movable apparatus and/or the camera.

The remote device can also include a viewable interface (e.g., a television or a computer screen) capable of displaying the captured images from the camera. Various method embodiments can include adjusting the view of a user of the remote device. For example, the captured images from the camera can be displayed on the screen so as to maintain the target region in a particular position on the screen (e.g., in the center). In some embodiments, the system can make these adjustments from time to time (e.g., from frame to frame, over a predetermined time period, or based upon some other timing parameter).

In various embodiments, the movable apparatus can be controlled by a user manually (e.g., a gimbaled movable apparatus can be moved by operating a joystick, for example).

The embodiments of the present disclosure also include system embodiments for controlling a movable apparatus on a vehicle. For example, in one embodiment the system can include a digital imager and a movable apparatus. In such embodiments, the digital imager can be a mega-pixel imager or other type of digital camera and can be mounted to a movable mount structure (e.g., the digital imager can be gimbal mounted). The movable apparatus can be gimbal mounted or mounted using another type of movable mount. The movable apparatus can be an imaging system (e.g., a targeting apparatus) and can include various components such as a laser designator, a laser spot tracker, and various sensors (e.g., various multi-spectral and/or hyper-spectral sensors, such as an electro-optical television sensor, an infrared sensor, etc.).

Some embodiments of the present disclosure can include executable instructions storable on a memory and executable by a processor to select a target region within a first frame of the image data, compare the frame with a subsequent frame to locate the target region in the subsequent frame, determine a frame shift between the frames, and determine an amount of movement of the movable apparatus based on the frame shift. Memory can be located proximate to the digital imager and/or the movable apparatus or at a remote location, such as within a remote computing device at a base of operations.

In various embodiments the target region can be selected manually (e.g., by a user via a remote computing device) or automatically (e.g., instructions can be executed to select the target region based on particular characteristics identifiable in the image data). As discussed above, the target region can be located in subsequent frames based on the particular characteristics, and a frame shift can be determined based on a shift of the target region from one frame to another.

This determined frame shift can be used to determine the amount of movement of the movable apparatus in order to maintain the pointing of the apparatus at the target within the target region. Executable instructions can then be executed to move the movable apparatus the determined amount.

DETAILED DESCRIPTION

The present disclosure includes a number of apparatus, system, and method embodiments for digital imaging stabilization for target tracking and/or controlling movable apparatuses. Embodiments of the present disclosure will now be described in relation to the accompanying drawings, which will at least assist in illustrating the various features of the various embodiments.

Figure 1:
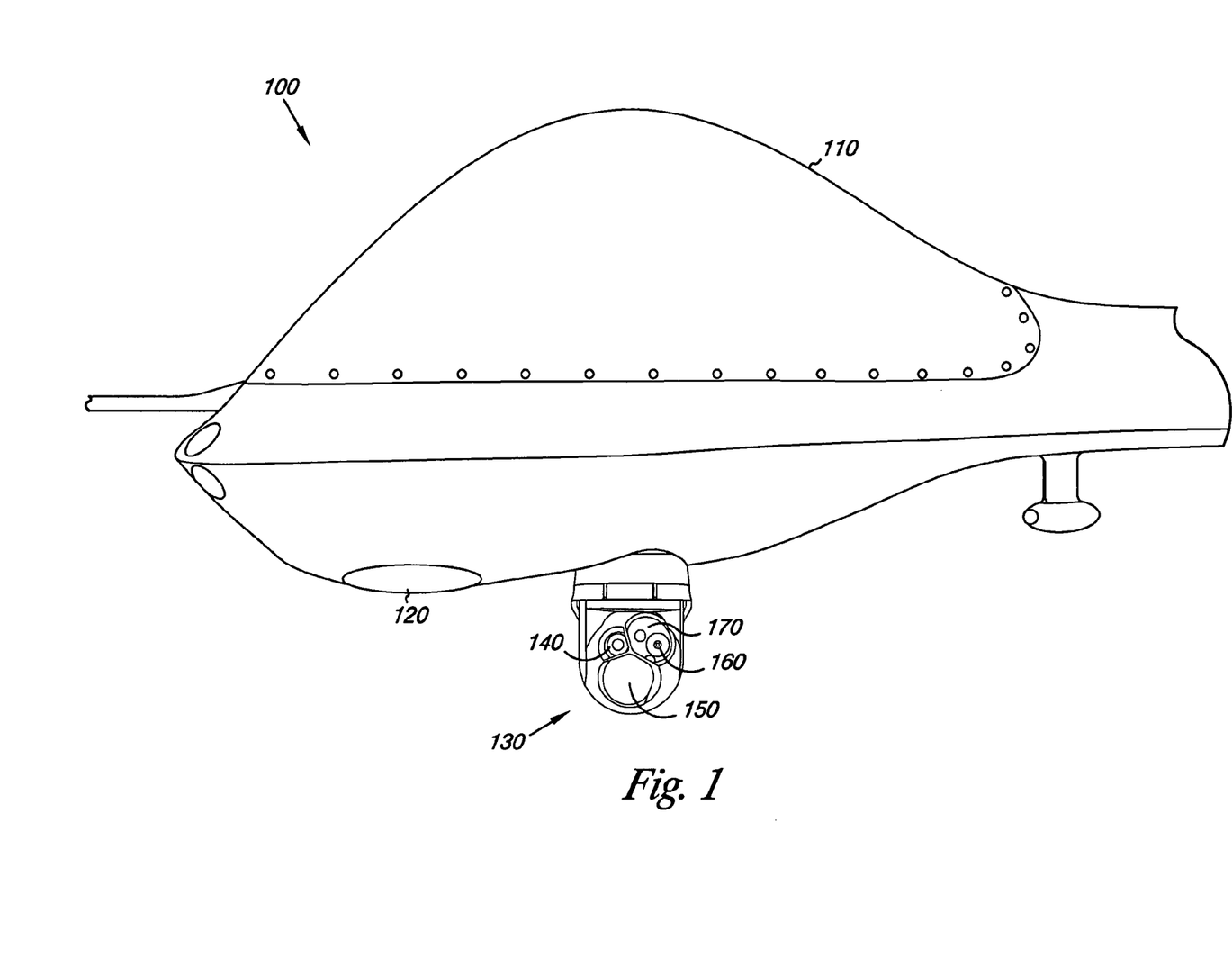
FIG. 1 is an illustration of a system embodiment for controlling a movable apparatus on a vehicle.

FIG. 1 is an illustration of a system embodiment for controlling a movable apparatus on a vehicle. The system 100 generally includes a camera 120 and a movable apparatus 130 mounted on a vehicle 110.

The vehicle 110 in the embodiment of FIG. 1 is shown as an unmanned aerial vehicle (UAV). Examples of UAVs include a Predator drone, a Global Hawk, or various other UAVs. In the embodiment of FIG. 1, the system 100 is mounted on the head section of a Predator drone 110. As stated above, embodiments of the present disclosure can be implemented on other types of manned and unmanned vehicles. For example, vehicle 110 can include ground vehicles (e.g., military vehicles or automobiles) and various manned aerial vehicles such as manned planes, space shuttles, air balloons, etc.

In the embodiment of FIG. 1, the movable apparatus 130 is a gimbaled apparatus. Movable apparatuses can be of various types and can have any functions where image stabilization would be helpful. As stated above, movable apparatuses can be various types of gimbal mounted and movable mounted apparatuses. A gimbaled apparatus refers to an apparatus that is capable of rotating in three dimensions (e.g., x, y, and z). The gimbaled apparatus 130 illustrated in FIG. 1 is a gimbaled targeting device and includes a number of components described in more detail below.

The gimbaled targeting device 130 includes an electro-optical television (EO-TV) sensor 140, a forward looking infrared (FLIR) sensor 150, a laser spot tracker 160, and a laser designator/rangefinder 170. Embodiments of the present disclosure can include various other types of movable apparatuses (e.g., other tracking, navigating, and/or pointing apparatuses, among others).

Embodiments of the disclosure can include a number of cameras. The cameras can be any suitable type of camera. Suitable cameras include one or more mega-pixel digital imagers or other cameras capable of providing digital image data. In FIG. 1, the element 120 identifies the general location of the number of cameras in the embodiment illustrated. An example of such camera positioning will be described below.

As discussed in detail herein, image data from the number of cameras can be stored in memory (e.g., frame by frame). This data can then be processed by one or more processors. The memory and/or processors can reside in various locations such as the camera, the gimbaled apparatus 130, the vehicle 110, and/or on a remote device (e.g., a remote computing device).

The processors can execute instructions storable in the memory to select a target region in a frame of image data, compare image data from a number of frames to locate the target region in a subsequent frame of image data, and determine a frame shift between the frames based on the position of the target region in the frames, among other functions.

As will be discussed below, the determined frame shift can then be used to calculate an amount to move the movable apparatus (e.g., gimbaled apparatus 130) so that it continues to point at a particular target (e.g., a particular object, spot, etc.) within the target region.

Figure 2:
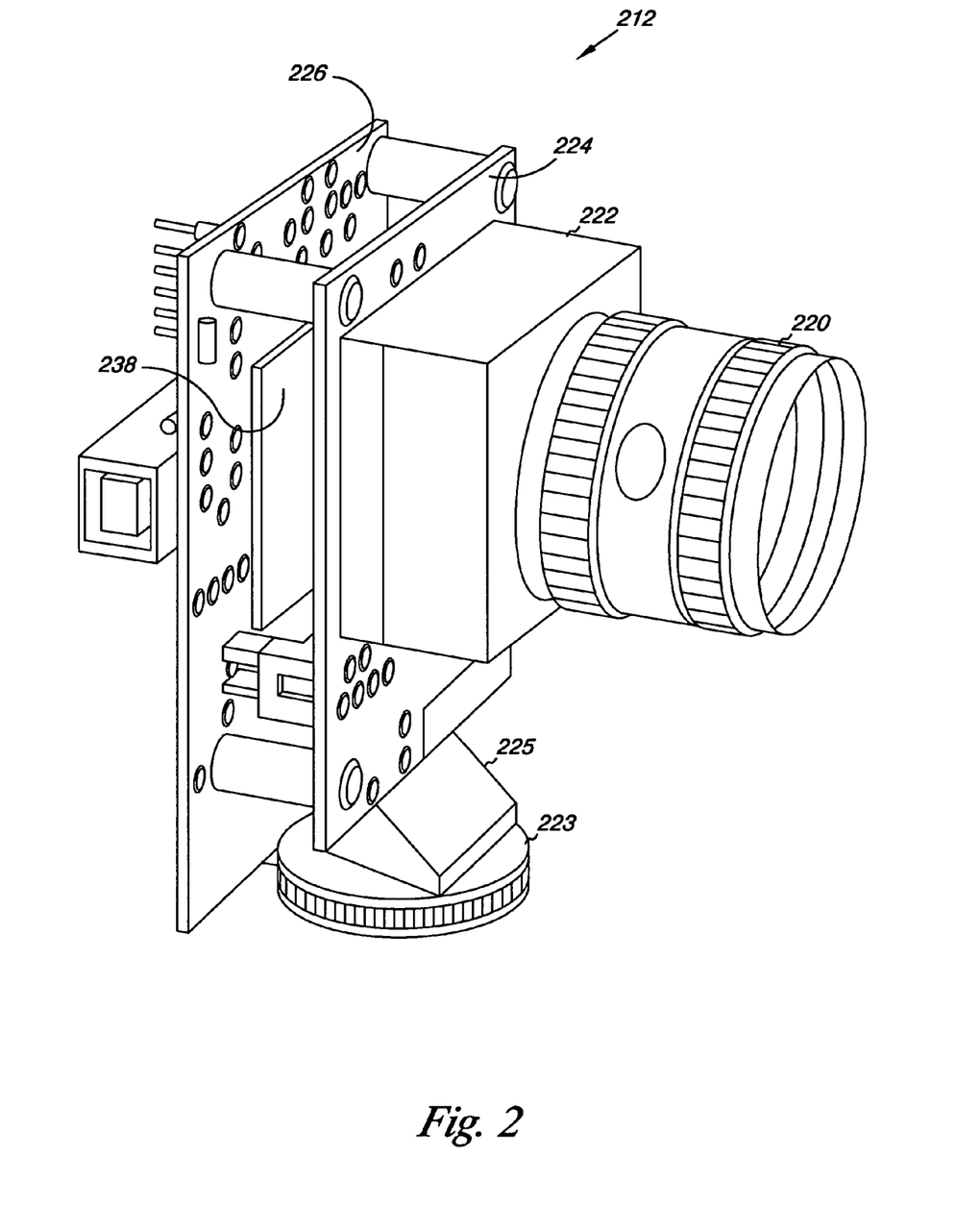
FIG. 2 is an illustration of an embodiment of a reference camera.

FIG. 2 is an illustration of an embodiment of a camera assembly. This camera assembly is an embodiment of a camera assembly for use in the system embodiment 100 illustrated in FIG. 1. In this embodiment, the camera 212 includes a lens 220, a lens mount 222, an imaging circuit board 224, and a digital signal processing (DSP) circuit board 226. Embodiments of the present invention can include adjustable or fixed aperture lenses. The lens mount 222 is used to mount the lens 220 to the imaging circuit board 224. In this way, the embodiment can have a small form factor, since the lens is mounted to the surface of the imaging circuit board 224.

In the embodiment shown in FIG. 2, the imaging circuit board 224 is mounted to the DSP circuit board 226. In the embodiment shown, the DSP circuit board 226 includes a processor 238. The functions of the processors of such apparatuses and systems are discussed in more detail herein. In the example shown in FIG. 2, the imaging circuit board 224 is spaced from the surface of the DSP circuit board 226 in order to allow airflow to aid in keeping the processor 238 cool, among other reasons.

Additionally, the DSP circuit board 226 is illustrated in the embodiment of FIG. 2 as being mounted behind the imaging circuit board 224. In this way, the form factor for this embodiment of the camera can be reduced. The embodiments of the present disclosure are not limited to such arrangement of components and that the DSP and imaging circuitry can be provided on more or less circuit boards. Embodiments having multiple circuit boards can be connected with flex circuitry, cables, and/or fibers, and the like.

The embodiment shown in FIG. 2 also includes a mounting structure which includes a mounting plate 225 for attachment to the camera assembly and a mounting portion 223 for attachment to a movable or fixed mount.

Figure 3A:
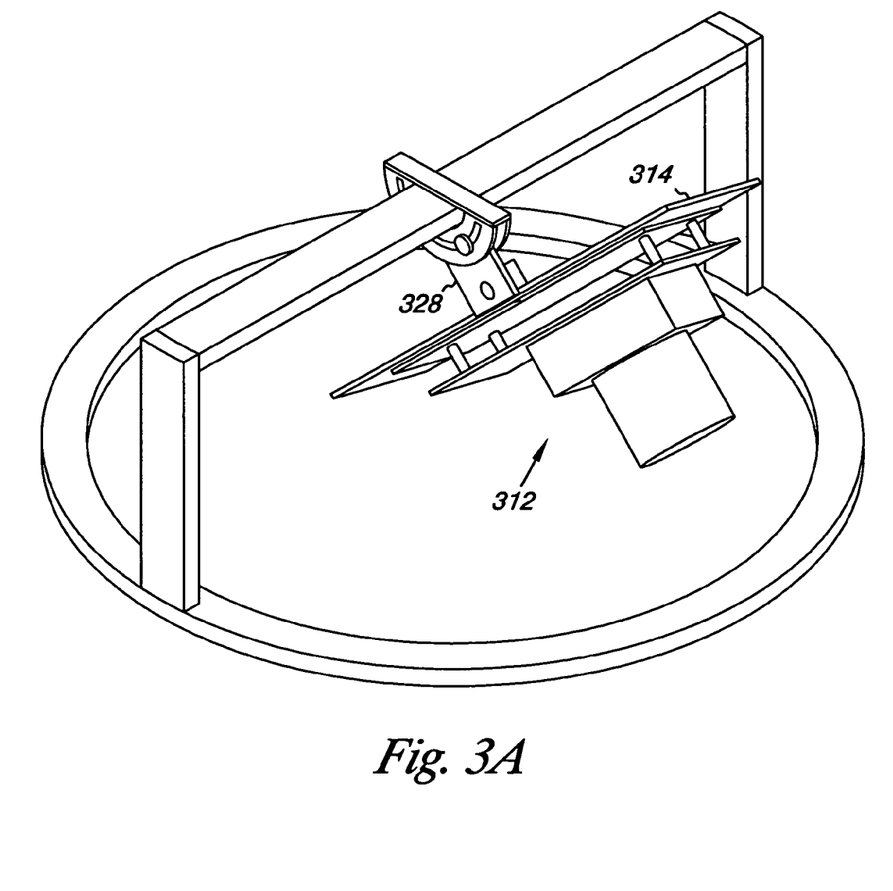
FIG. 3A is an illustration of an embodiment of a reference camera apparatus.

FIG. 3A is an illustration of an embodiment of a reference camera apparatus. In this embodiment, the apparatus includes a fixed mount structure. The camera 312 shown in FIG. 3A can be any suitable camera or camera array. One suitable camera is camera 212 shown in FIG. 2.

A mounting arm 328 can be used, as shown in FIG. 3A, to position the camera 312. In the embodiment shown in FIG. 3A, the position of camera 312 is fixed. In this way, the camera 312 can record images from the same frame of reference. As discussed above, the camera 312 can be mounted to the mounting arm 328 through use of a mounting plate 314 or other suitable mounting structure, such as that discussed in FIG. 2, for example.

Additionally, as stated above, a circuit board, such as an imaging circuit board, a DSP circuit board, or a combined circuit board, among others, can be used to mount the camera to the mounting arm 328. The example structure and type of movement shown in FIG. 3A is but one example of the possible types of mount structures that can be utilized with respect to the embodiments of the present invention.

Figure 3B:
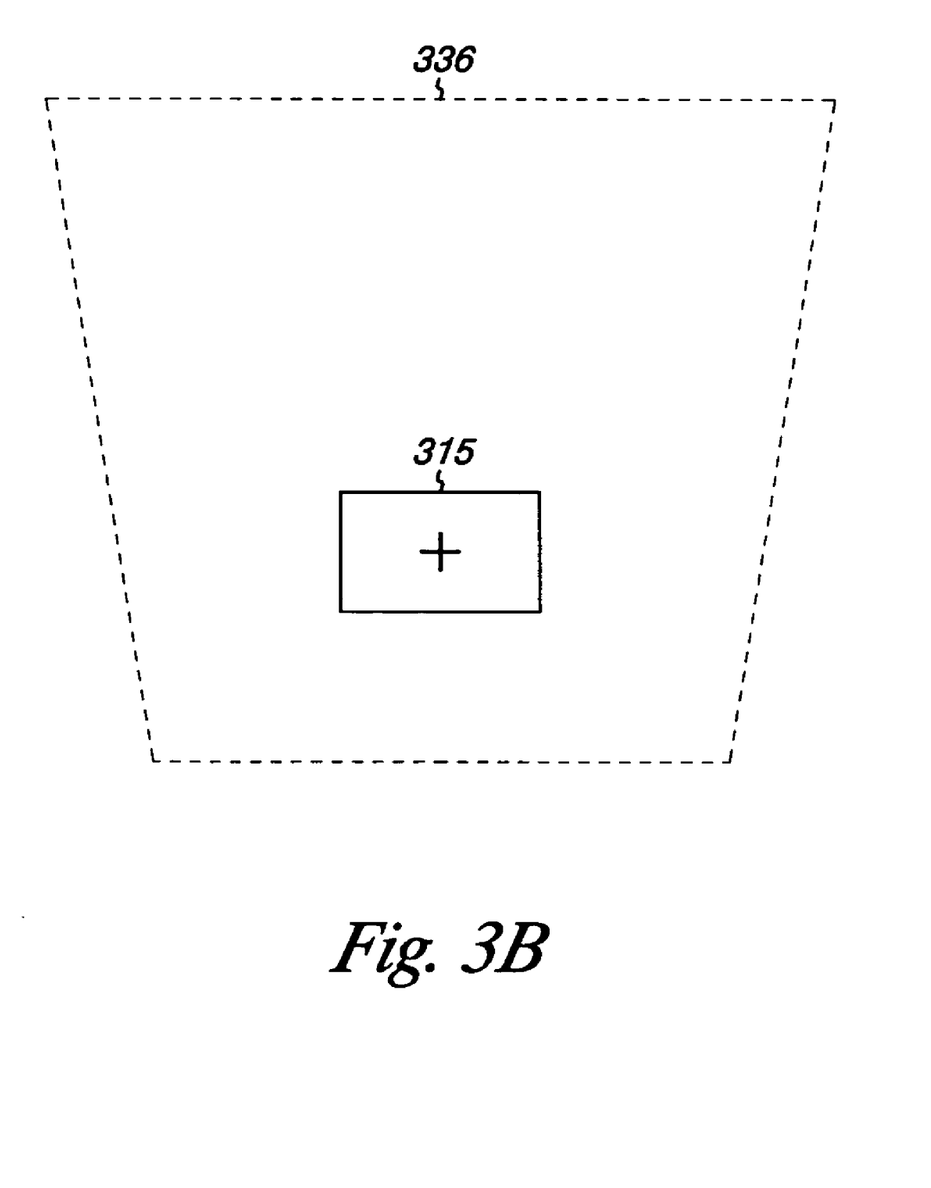
FIG. 3B is an illustration of an image frame of the reference camera apparatus embodiment of FIG. 3A.

FIG. 3B is an illustration of an image frame 336 of the reference camera apparatus embodiment of FIG. 3A. Image frame 336 represents one frame of image data from the reference camera captured at a particular time. A frame of image data refers to the data associated with the digital sensor elements of the digital camera. A digital camera is capable of generating frames at various rates from around 1 frame/second to over 100,000 frames/second. Therefore, subsequent image frames may or may not contain the same image data as a prior image frame. That is, even slight movements of the camera can cause the image data of subsequent image frames to be different.

The image frame 336 illustrated in FIG. 3B also includes a target region 315. Target region 315 is a region within frame 336 and can include an object and/or surface that has identifiable image data characteristics (e.g., shape, color, temperature, composition, etc.) such that it can be identified from frame to frame. For example, region 315 could include a building with a particular shape such that when imaged from above the shape of the roof can be used as a reference point in subsequent frames.

That is, as will be discussed in detail in connection with the embodiment of FIG. 5, executable instructions can be executed by a processor, for example, to determine the location of the target region (e.g., target region 315) in a subsequent frame based on the image data in a prior frame. For instance, in the example above, instructions can be executed to determine the location of the reference point (e.g., the building roof) in a subsequent image frame (e.g., the building roof can be tracked from frame to frame based on its particular shape).

Instructions can also be executed to determine a frame shift between image frames (e.g., how much the reference point moved between frames). The frame shift can be determined in various ways. In some embodiments, the frame shift can be determined by using motion vector information (e.g., motion vector fields, motion vector histograms, etc.) associated with movement of the camera from frame to frame, for example.

In various embodiments, the frame shift can be measured as a pixel shift in the image data of the frames. That is, instructions can be executed to determine that a target region (e.g., target region 315) has moved a certain number of pixels (e.g., 1 pixel, 5, pixels, 100 pixels, etc.) in a particular direction, or directions, between a first frame and a subsequent frame.

In various embodiments of the present disclosure, instructions can also be executed to determine an amount that a movable apparatus can be moved in order that the movable apparatus (e.g. gimbaled apparatus 130) and/or one of its components (e.g., 140, 150, 160, and/or 170) remains pointed at a target in the target region (e.g., target region 315).

In various embodiments, instructions can be executed to control the movable apparatus automatically. That is, instructions can be executed to automatically move the movable apparatus an appropriate amount, for example on a frame by frame basis, based on the calculated frame shift.

Figure 4A:
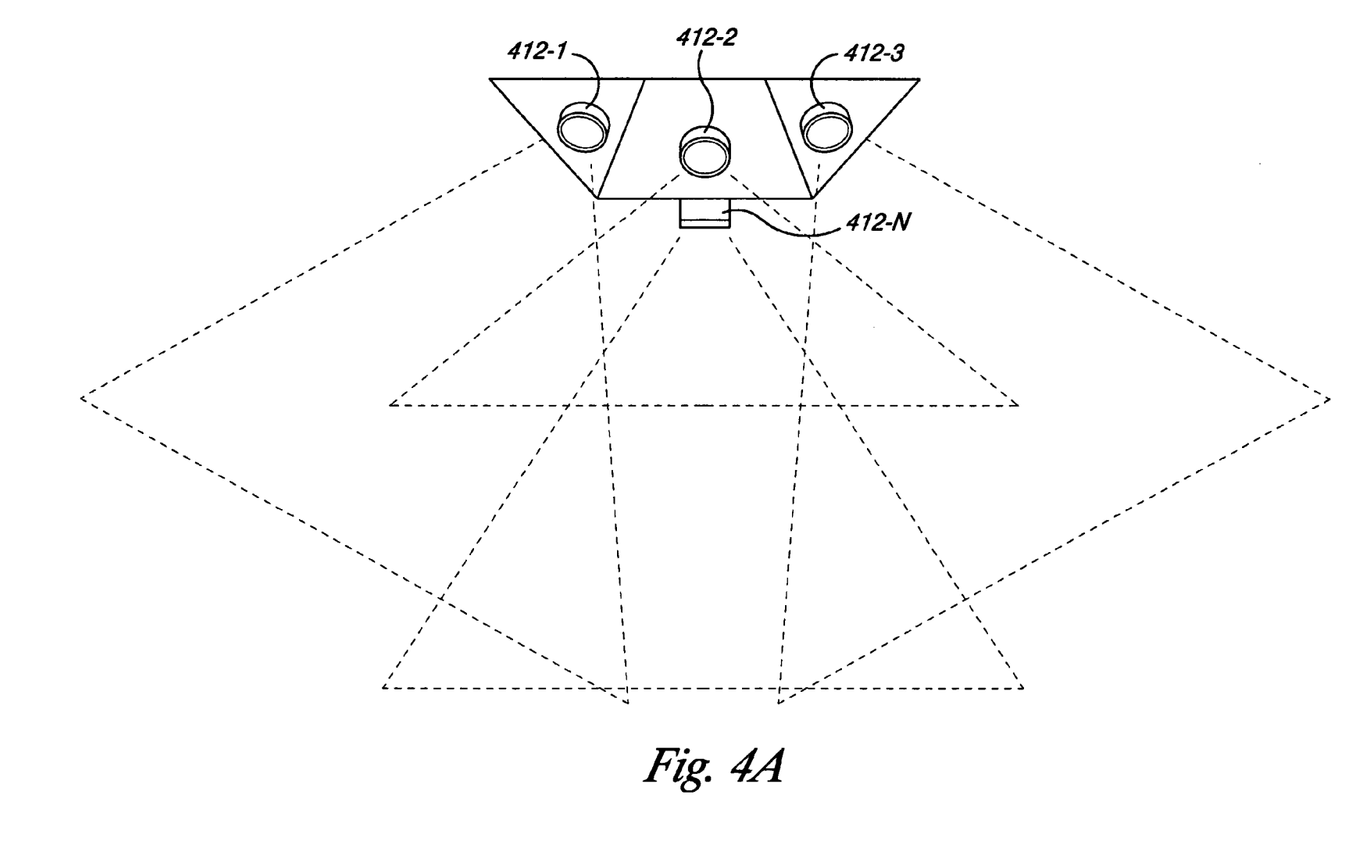
FIG. 4A is an illustration of a multiple camera apparatus embodiment.

FIG. 4A is an illustration of a multiple camera apparatus embodiment. The embodiment of FIG. 4A illustrates a number of cameras 412-1, 412-2, 412-3, and 412-N. The designator "N" is used to indicate that the embodiment of FIG. 4A can include any number of cameras.

In this embodiment, the cameras are fixed, and each camera has a different field of view. In this embodiment, the cameras are positioned such that a portion of each of the fields of view (indicated by the dashed lines) overlap each other slightly. Embodiments of the present disclosure are not limited to a fixed array of cameras or to a camera array in which the fields of view overlap.

Each of the fields of view of the cameras has an edge. The fields of view can be of any suitable shape. For example, a field of view can be circular or oval shaped, in which case, the field of view can have one edge. The field of view can be polygonal in shape, or an irregular shape, for example, in which case, the field of view can have three or more edges. In many digital imaging cameras, the imaging sensors are rectangular and, therefore, the field of view is rectangular in shape and has four edges. In various embodiments, the cameras can be positioned such that portions of the edges of at least two fields of view can abut or overlap each other. In this way, a composite image can be created based upon the overlapping or abutting relationship between the fields of view, as will be discussed in more detail with respect to FIG. 4B.

Figure 4B:
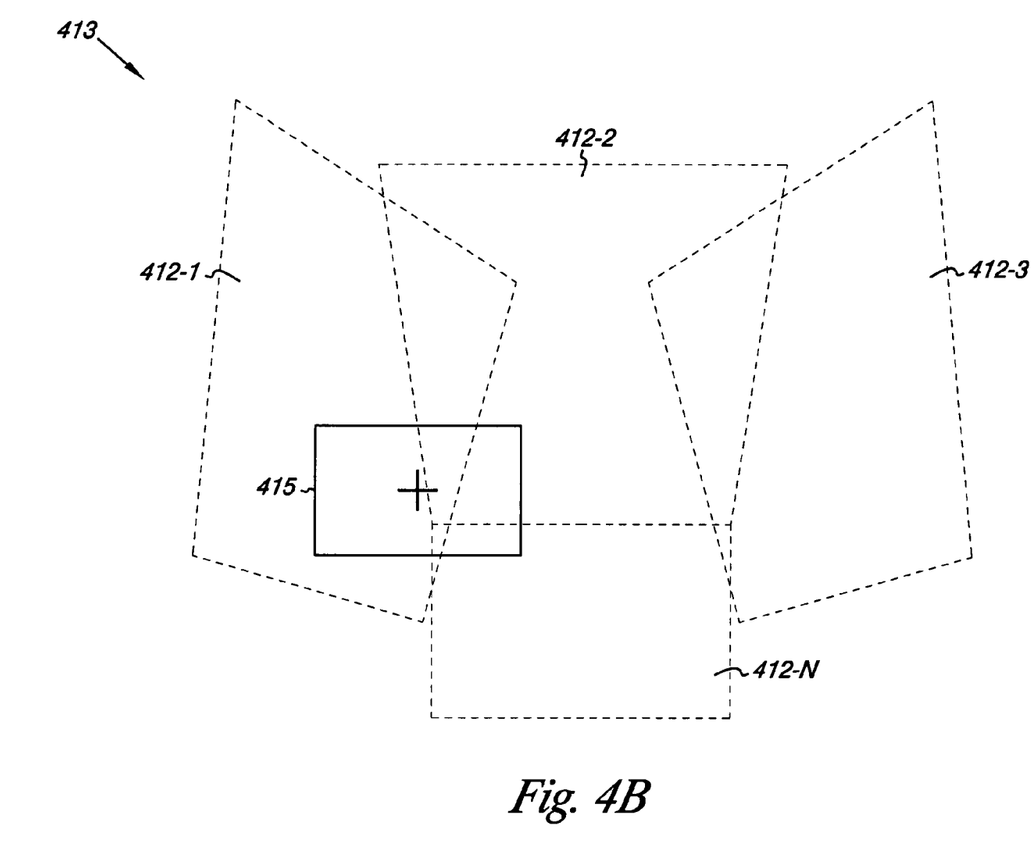
FIG. 4B is an illustration of image frames from the multiple camera apparatus embodiment of FIG. 4A.

FIG. 4B is an illustration of image frames from the multiple camera apparatus embodiment of FIG. 4A. In FIG. 4B the image frames 412-1, 412-2, 412-3, and 412-N associated with the cameras in FIG. 4A are illustrated. In this embodiment, the image data associated with each of the image frames 412-1, 412-2, 412-3, and 412-N overlaps the image data associated with at least one other image frame.

In embodiments such as that shown with respect to FIGS. 4A and 4B, the camera array can be associated with imaging circuitry and/or computer executable instructions that can provide a composite field of view created by the combined fields of view of the multiple cameras.

The multiple camera embodiment of FIG. 4B includes a target region 415 that can be used as a reference zone within the image frames 412-1, 412-2, 412-3, and 412-N. As discussed above in connection with the embodiment illustrated in FIG. 3B, logic circuitry and/or computer executable instructions can process the image data of one or more of the cameras to determine a target region (e.g., target region 415 within a first frame and compare the image data of the first frame with image data of a second frame to locate the target region in the second frame.

Also as discussed above, the logic circuitry and/or computer executable instructions can calculate a frame shift associated with the difference between the position of the target region in the first frame and the second frame. This frame shift information can be used to move the movable apparatus by an amount determined based on the signaled frame shift information.

Figure 5:
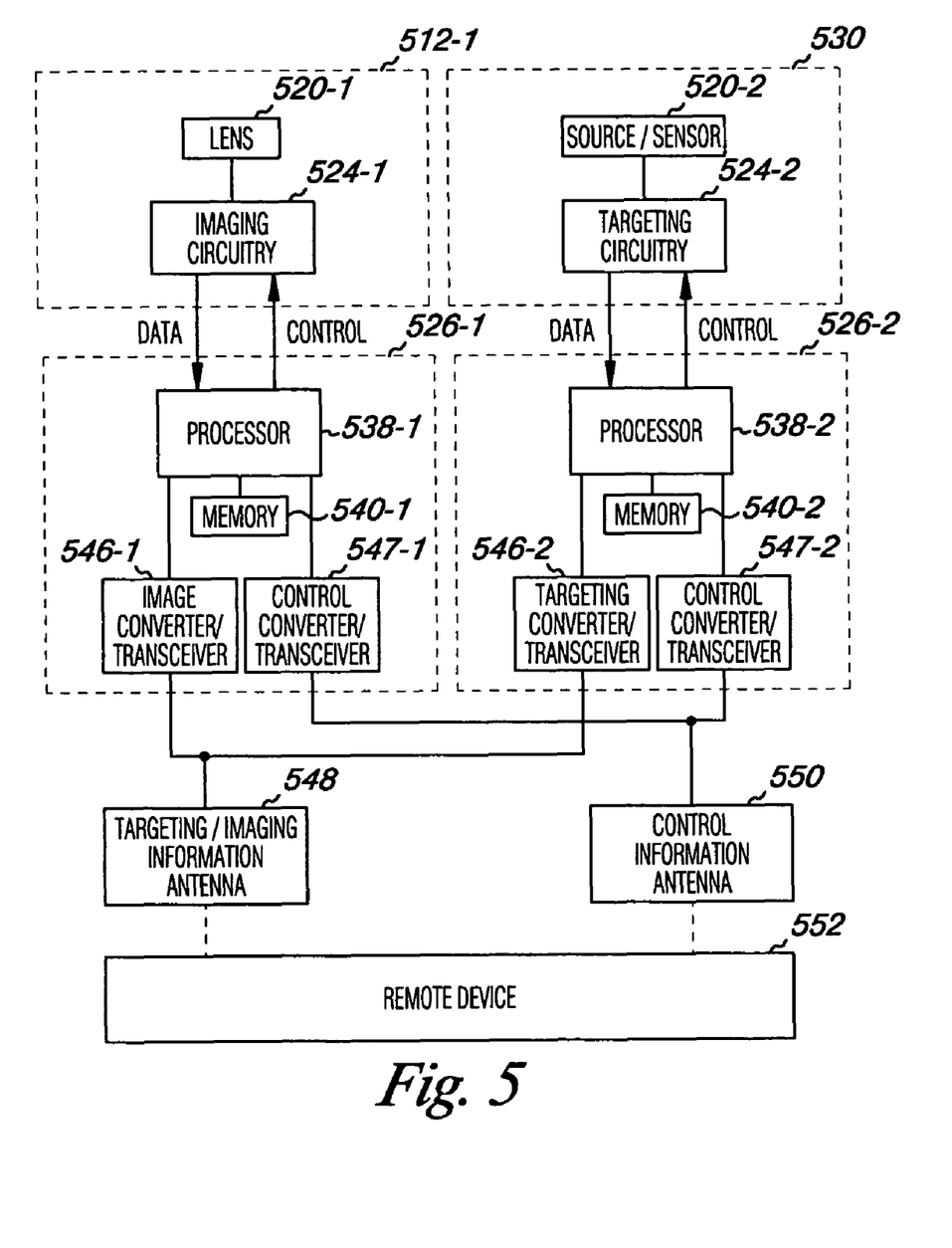
FIG. 5 is an illustration of an embodiment of a system for controlling a movable apparatus according to the present disclosure.

FIG. 5 is an illustration of an embodiment of a system for controlling a movable apparatus according to the present disclosure. The illustrated embodiment of FIG. 5 includes a camera assembly 512-1 and movable apparatus 530. In the embodiment shown in FIG. 5, the camera assembly includes a lens 520-1 and imaging circuitry 524-1. The movable apparatus includes a source/sensor 520-2 (e.g., a laser designator, multi-spectral sensor, etc.) and targeting circuitry 524-2.

Image and camera control information can be passed between the camera assembly 512-1 and a circuit board 526-1. Similarly, targeting data and movable apparatus control information can be passed between the movable apparatus and a circuit board 526-2. In the embodiment of FIG. 5, each circuit board includes a processor (e.g., 538-1 and 538-2) and memory (e.g., 540-1 and 540-2). Each circuit board includes a control information converter/transceiver (e.g., 547-1 and 547-2). Circuit board 526-1 includes an image information converter/transceiver 546-1 and circuit board 526-2 includes a targeting converter/transceiver 546-2. These components can be used to select and format image data and/or targeting data to be collected, and to process, store, display, transmit, and/or print collected image data and/or targeting data. The components can also be used to control the selection of, zoom, pan, and/or movement of the camera 512-1 and movable apparatus 530.

Memory 540-1 and 540-2 can be used to store image data, targeting data, and/or computer executable instructions for receiving, manipulating, and/or sending image data and/or targeting data as well as controlling the camera and/or movable apparatus movement, selecting a camera and/or movable apparatus component (e.g., a sensor), a field of view, and/or a zoom ratio, among other functions. Memory can be provided in one or more memory locations and can include various types of memory including, but not limited to RAM, ROM, and Flash memory, among others.

One or more processors, such as processor 538-1 and 538-2 can be used to execute computer executable instructions (e.g. program instructions) for the above functions. The imaging circuitry 524-1 and DSP circuitry on circuit board 526-1, as described above, can be used to control the receipt and transfer of image data and can control the movement of the camera 512-1. Additionally, these functionalities can be accomplished through use of a combination of circuitry and computer executable instructions.

Similarly, the targeting circuitry 524-2 on circuit board 526-2 can be used to control the receipt and transfer of targeting data and can control the movement of the movable apparatus 530. For example, targeting circuitry 542-2 can receive image stabilization data from camera 512-1 and/or from a remote device 552. The targeting circuitry can then control the movable apparatus by moving it by the amount indicated by the image stabilization data. Additionally, these functionalities can be accomplished through use of a combination of circuitry and computer executable instructions.

The image and targeting information can be directed to other devices or systems for various purposes. This direction of the information can be by wired or wireless connection.

For example, in the embodiment illustrated in FIG. 5, the image information converter/transceiver 546-1, the targeting converter/transceiver 546-2, and the control information converter/transceivers 547-1 and 547-2 are connected to one or more antennas. In FIG. 5, the image information converter/transceiver 546-1 and the targeting converter/transceiver 546-2 are connected to an imaging/targeting information antenna 548 and the control information converter/transceivers 547-1 and 547-2 are connected to a control information antenna 550.

The imaging/targeting information antenna 548 can be of any suitable type, such as an NTSC antenna suited for communicating information under the NTSC standard discussed above. The camera/gimbaled apparatus control antenna 550 can also be of any suitable type. For example, antennas for communicating wireless RF information are one suitable type.

The embodiment shown in FIG. 5 also includes a remote device 552. As stated above, the remote device can be any type of device for communication of information to and/or from the imaging/targeting information antenna and/or the camera/movable apparatus control antenna. Such devices include computing devices and non-computing devices such as remote RF transmitting devices, and the like.

Various embodiments of a system for controlling a movable apparatus can include more or less components than are shown in the embodiment of FIG. 5. For example, embodiments of a system for controlling a movable apparatus can include more or less cameras, sensors, remote devices, and/or logic circuitry (e.g., processors, memory, converters, receivers, antennas, etc).

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the disclosure includes various other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. A target tracking apparatus for use on a moving vehicle, comprising:
    a reference camera;
    a processor to receive image data from the reference camera;
    a memory connected to the processor;
    instructions storable in the memory and executable by the processor to:
        process the image data to determine a stationary target region within a first frame of the image data;
        compare image data of the first frame with image data of a second frame, wherein all of the image data of the first frame has shifted to a different location either within the second frame or out of the second frame due to movement of the vehicle, to locate the stationary target region in the second frame;
        calculate a frame shift between the first frame and the second frame by using the position of the stationary target region within the first frame and the shifted position of the stationary target region within the second frame without use of data from a navigation system of the moving vehicle; and
        adjust a user's view of an entirety of an image associated with the image data to maintain the stationary target region in a particular position on a viewable interface from frame to frame by moving the reference camera based on the calculated frame shift.

2. The apparatus of claim 1, including instructions executable by the processor to automatically select the stationary target region based on particular characteristics identifiable in the image data.

3. The apparatus of claim 1, including instructions executable by the processor to calculate a movement of the reference camera, for capturing a third frame, by using the calculated frame shift.

4. The apparatus of claim 1, including instructions executable by the processor to adjust the user's view of the image data to maintain the stationary target region in the center of the viewable interface from frame to frame.

5. The apparatus of claim 1, including a gimbaled targeting device oriented in a first position.

6. The apparatus of claim 5, wherein the gimbaled targeting device is oriented such that a pointing device of the gimbaled targeting device points at an object within the stationary target region based upon the comparison of the first and second frames of image data of the reference camera.

7. The apparatus of claim 6, wherein the reference camera and the gimbaled targeting device are separately attached to the moving vehicle.

8. The apparatus of claim 5, including instructions executable by the processor to move the gimbaled targeting device to a second position based upon the frame shift calculated by the comparison of the first and second frames of image data of the reference camera.

9. The apparatus of claim 8, wherein the gimbaled targeting device includes at least one of:
    an imaging sensor;
    a laser rangefinder; and
    a laser spot tracker.

10. The apparatus of claim 1, wherein the reference camera has a digital zooming capability.

11. The apparatus of claim 1, wherein the reference camera has a digital panning capability.

12. The apparatus of claim 1, wherein the reference camera is mounted to a movable mount structure.

13. A method for digital image stabilization, comprising:
capturing a first image of a stationary target region at a first time with a camera attached to a moving vehicle;
capturing a second image of the stationary target region at a second time with the camera, wherein all of the image data of the first image has shifted to a different location either within the second image or out of the second frame due to the movement of the vehicle; determining a change in position of the moving vehicle by comparing image data from the first image and the second image;
calculating a shift between the first image and the second image by using the position of the stationary target region within the first image and the shifted position of the stationary target region within the second image without use of data from a navigation system of the moving vehicle; and
adjusting a user's view of the second image to maintain the stationary target region in a particular position on a viewable interface after the change in position of the vehicle by moving the camera based on the calculated shift, wherein the user's view comprises an entirety of the captured second image.

14. The method of claim 13, wherein the method includes controlling a gimbaled apparatus based upon the calculated shift.

15. The method of claim 14, wherein the method includes controlling the gimbaled apparatus on a per-image basis.

16. The method of claim 13, wherein the method includes determining an amount to move a gimbaled apparatus based upon the calculated shift.

17. The method of claim 13, wherein the method includes determining a direction to move a gimbaled apparatus based upon the calculated shift.

18. The method of claim 13, wherein the method includes sending the calculated shift to a remote device.

19. A system for controlling a movable apparatus on a moving vehicle, comprising:
a digital imager;
a movable apparatus physically coupled to the digital imager;
a processor to receive image data from the digital imager;
a memory connected to the processor;
instructions storable in the memory and executable by the processor to:
select a stationary target region within a first frame of the image data;
compare the first frame of the image data with a subsequent frame of the image data to locate the stationary target region in the subsequent frame;
determine a frame shift between the first frame and the subsequent frame based on the position of the stationary target region within the first frame and the position of the stationary target region within the subsequent frame, wherein all of the image data of the first frame has shifted to a different location either within the second frame or out of the second frame due to movement of the vehicle without use of data from a navigation system of the moving vehicle;
determine an amount of movement of the movable apparatus based on the frame shift; and
adjust a user's view of an entirety of an image associated with the image data to maintain the stationary target region in a particular position on a viewable interface from frame to frame by moving the movable apparatus based on the determined frame shift.

20. The system of claim 19, wherein the system includes a remote device capable of receiving the image data and transmitting a control signal to the movable apparatus based on the determined amount of movement.

21. The system of claim 20, wherein the movable apparatus includes circuitry to receive the control signal from the remote device.

22. The system of claim 21, wherein the movable apparatus includes circuitry to move the movable apparatus by the determined amount based upon the received signal.

23. The system of claim 19, wherein the movable apparatus is an imaging system having at least one imaging component from the group including:
an imaging sensor;
a laser designator; and
a laser spot tracker.

24. The system of claim 23, including instructions executable by the processor to point the at least one imaging component of the imaging system at a particular spot within the stationary target region in the subsequent frame based on the determined amount of movement.

25. The system of claim 19, including instructions executable by the processor to calculate a movement of the digital imager based on the frame shift.

26. The system of claim 19, wherein the digital imager is a mega-pixel imager.

* * * * *